(12) United States Patent
Khaleghimeybodi et al.

(10) Patent No.: US 11,671,739 B2
(45) Date of Patent: Jun. 6, 2023

(54) ADJUSTMENT MECHANISM FOR TISSUE TRANSDUCER

(71) Applicant: Meta Platforms Technologies, LLC, Menlo Park, CA (US)

(72) Inventors: Morteza Khaleghimeybodi, Bothell, WA (US); Michael Edward Franks, Snoqualmie, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/366,776

(22) Filed: Jul. 2, 2021

(65) Prior Publication Data

US 2021/0337300 A1  Oct. 28, 2021

Related U.S. Application Data

(63) Continuation of application No. 16/591,984, filed on Oct. 3, 2019, now Pat. No. 11,082,765.

(51) Int. Cl.
 *H04R 1/10*  (2006.01)
(52) U.S. Cl.
 CPC ....... *H04R 1/1041* (2013.01); *H04R 2460/13* (2013.01)
(58) Field of Classification Search
 CPC .............. H04R 1/00; H04R 1/02; H04R 1/10; H04R 1/1008; H04R 1/1016; H04R 1/105; H04R 1/1058; H04R 1/1066; H04R 1/1075; H04R 1/28; H04R 5/033; H04R 5/0335; H04R 25/00; H04R 25/02; H04R 25/04; H04R 25/60; H04R 25/604; H04R 25/606; H04R 25/607; H04R 25/65; H04R 25/656; H04R 25/652; H04R 2201/00; H04R 2201/02;
(Continued)

(56) References Cited

U.S. PATENT DOCUMENTS

2004/0160572 A1\* 8/2004 Jannard ................ H04B 1/385
 351/158
2009/0052716 A1\* 2/2009 Yamaguchi .......... H04R 1/1058
 381/378

(Continued)

FOREIGN PATENT DOCUMENTS

CN  109270710 A  1/2019
KR  100865959 B1  10/2008
WO  2018236126 A1  12/2018

OTHER PUBLICATIONS

International Preliminary Report on Patentability for International Application No. PCT/US2020/048960, dated Apr. 14, 2022, 11 pages.

(Continued)

*Primary Examiner* — Walter F Briney, III
(74) *Attorney, Agent, or Firm* — Fenwick & West LLP

(57) ABSTRACT

A headset includes a tissue transducer on a carriage that translates along a temple portion of the headset. The carriage is configured to contact the helix root of a user's ear. The helix root provides a reference point, and when the carriage is contact with the helix root, the tissue transducer is configured to be located in a target area. By maintaining a fixed location of the tissue transducer relative to the helix root of the user's ear, the tissue transducer may be accurately positioned, even for users with different head shapes and sizes.

18 Claims, 10 Drawing Sheets

(58) Field of Classification Search
CPC ...... H04R 2201/10; H04R 2201/10103; H04R 2201/105; H04R 2205/022; H04R 2225/00; H04R 2225/021; H04R 2225/0213; H04R 2225/025; H04R 2460/00; H04R 2460/09; H04R 2460/13; H04R 2499/00; H04R 2499/10; H04R 2499/15

See application file for complete search history.

(56) References Cited

U.S. PATENT DOCUMENTS

| | | | | |
|---|---|---|---|---|
| 2014/0010389 | A1* | 1/2014 | Slocum | H04R 1/1066 381/379 |
| 2015/0181338 | A1* | 6/2015 | Hosoi | H04R 1/02 381/309 |
| 2015/0271590 | A1* | 9/2015 | Nakagawa | H04R 1/1091 381/151 |
| 2020/0053449 | A1* | 2/2020 | Ito | H04R 1/105 |
| 2020/0089008 | A1* | 3/2020 | Silfvast | G02B 27/017 |

OTHER PUBLICATIONS

International Search Report and Written Opinion for International Application No. PCT/US2020/048960, dated Dec. 3, 2020, 12 pages.

\* cited by examiner

500

Translate an adjustable transducer assembly along the temple of the headset.
510

Contact a helix root of the user's ear with an indexing feature on the adjustable transducer assembly.
520

Produce audio content for the user via tissue conduction using the tissue transducer on the adjustable transducer assembly.
530

FIG. 5

ADJUSTMENT MECHANISM FOR TISSUE TRANSDUCER

CROSS REFERENCE TO RELATED APPLICATIONS

This application is a continuation of co-pending U.S. application Ser. No. 16/591,984, filed Oct. 3, 2019, which is incorporated by reference in its entirety.

FIELD OF THE INVENTION

This disclosure relates generally to artificial reality systems, and more specifically to audio transducers for headsets.

BACKGROUND

Headsets that present audio content to a user, such as artificial reality headsets (including virtual reality (VR), augmented reality (AR), and mixed reality (MR)), present sound using acoustic transducers. Conventionally, acoustic transducers are generally at fixed locations on headsets despite users having different head shapes, head sizes, etc. Accordingly, variations in relative location of the acoustic transducer between different users and/or a same user wearing the headset at different time (but in a different position) can prevent users from having a consistent audio experience.

SUMMARY

A headset includes an audio transducer on a carriage that translates along a temple portion of the headset. The carriage is configured to contact a helix root of a user's ear. The helix root provides a reference point, and when the carriage is in contact with the helix root, the audio transducer is configured to be located in a target area.

In some embodiments, the headset includes at least one spring that biases the carriage in a rearward direction. When a user places the headset on the user's head, the carriage engages the helix root of the user's ear. As the user moves the headset in a rearward direction (e.g., moves the front portion of the headset towards the user's eyes and nose), the contact force from the helix root applied to the carriage overcomes the spring force biasing the carriage and causes the carriage to translate in a forward direction along the temple portion of the headset. The spring force keeps the carriage in contact with the helix root.

In some embodiments, the headset includes a motor that drives the carriage along the temple of the headset. After placing the headset on a user's head, the user may instruct the carriage to translate in a rearward direction. The carriage may translate in a rearward position until the carriage contacts the helix root of the user.

In some embodiments, an adjustable transducer assembly comprises a tissue transducer configured to provide audio content to a user of a headset. The adjustable transducer assembly may further comprise a carriage configured to translate along the temple. The carriage may be coupled to the tissue transducer and include an indexing feature. The indexing feature translates with the carriage along the temple such that the indexing feature is positioned against a helix root of an ear of the user and the tissue transducer is positioned to provide the audio content via tissue conduction to a target area.

In some embodiments, a headset comprises a frame including a temple. The headset includes an adjustable transducer assembly coupled to the template. The adjustable transducer assembly comprises a tissue transducer configured to provide audio content to a user of a headset and a carriage configured to translate along a temple of the headset. The carriage is coupled to the tissue transducer and includes an indexing feature, wherein the indexing feature translates with the carriage along the temple such that the indexing feature is positioned against a helix root of an ear of the user and the tissue transducer is positioned to provide the audio content via tissue conduction to a target area.

In some embodiments, a headset comprises a frame including a temple, a carriage configured to translate along the temple, and a cartilage conduction transducer coupled to the carriage. The cartilage conduction transducer may be configured contact a tragus of a user.

BRIEF DESCRIPTION OF THE DRAWINGS

FIG. 5 is a flowchart illustrating a process for presenting audio content using an adjustable transducer assembly, in accordance with one or more embodiments.

Figure 1:
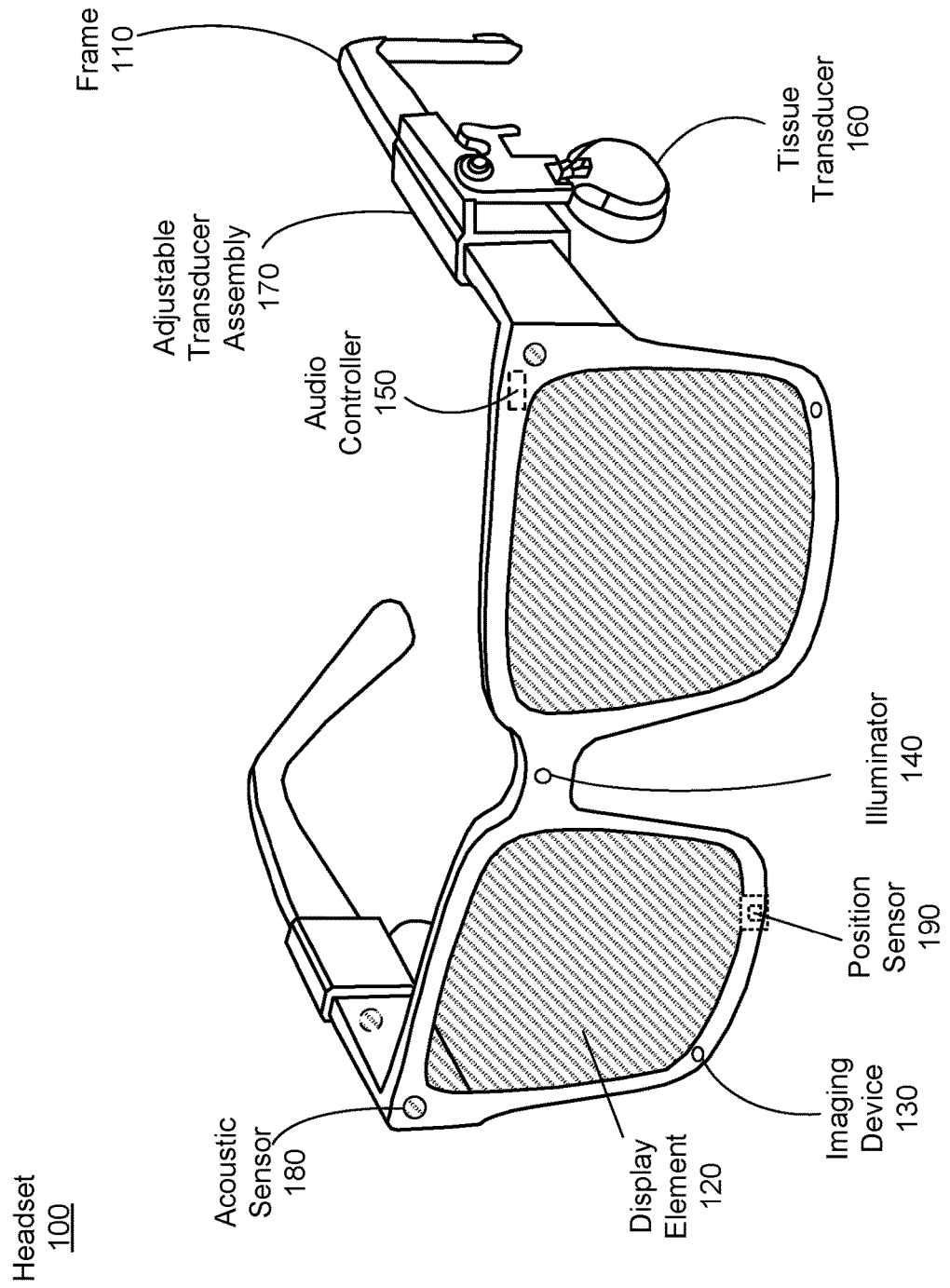
FIG. 1 is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A headset includes an audio transducer on a carriage that translates along a temple portion of the headset. The carriage is configured to contact a helix root of a user's ear. The helix root provides a reference point, and when the carriage is contact with the helix root, the audio transducer is configured to be located in a target area. For some audio transducers, such as a cartilage conduction transducer configured to contact the tragus of a user's ear, even small differences in positioning of the audio transducer may result in substantial loss in the sound provided to the user by the audio transducer. However, by maintaining a fixed location of the audio transducer relative to the helix root of the user's ear (such as positioning the audio transducer in contact with the tragus), as opposed to relative to a location on the headset, the audio transducer may be accurately positioned, even for users with different head shapes and sizes.

In some embodiments, the headset includes a spring that biases the carriage in a rearward direction. When a user places the headset on the user's head, the carriage engages the helix root of the user's ear. As the user moves the headset in a rearward direction (e.g., moves the front portion of the headset towards the user's eyes and nose), the contact force from the helix root applied to the carriage overcomes the spring force biasing the carriage and causes the carriage to translate in a forward direction along the temple portion of the headset. The spring force keeps the carriage in contact with the helix root.

In some embodiments, the headset includes a motor that drives the carriage along the temple of the headset. After placing the headset on a user's head, the user may instruct the carriage to translate in a rearward direction. The carriage may translate in a rearward direction until the carriage contacts the helix root of the user. The user may instruct the carriage to stop translating, or the headset may detect that the carriage has contacted the helix root of the user, and the motor may stop driving the carriage rearward.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 110, and may include, among other components, a display assembly including one or more display elements 120, a depth camera assembly (DCA), an audio system, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. A hinged end of the temples (also referred to as a forward end) connects the temples to the front part of the frame 110. The temples may also include a portion that curls behind the ear of the user (also referred to as a curved end or rear end).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1 shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers and an adjustable transducer assembly 170 for one or both temples of the frame 110. A transducer may be a speaker or a tissue transducer 160 (e.g., a bone conduction transducer or a cartilage conduction transducer). In some embodiments, instead of individual speakers for each ear, the headset 100 includes a speaker array comprising multiple speakers integrated into the frame 110 to improve directionality of presented audio content. The tissue transducer 160 couples to the head of the user and directly vibrates tissue (e.g., bone or cartilage) of the user to generate sound. The number and/or locations of transducers may be different from what is shown in FIG. 1.

The adjustable transducer assembly 170 is configured to position the tissue transducer 160 in a location suitable for tissue transduction regardless of the size and shape of a user's head. The adjustable transducer assembly 170 is configured to translate forwards and backwards along the temples of the frame 110. The adjustable transducer assembly 170 includes a transducer, such as a speaker, a cartilage transducer, or a bone transducer. The adjustable transducer assembly 170 may be biased in a rearward position, such as by a spring. In response to a user putting on the headset 100, the adjustable transducer assembly 170 is configured to contact a portion of the ear of the user. The contact between the ear and the adjustable transducer assembly 170 may cause the adjustable transducer assembly 170 to translate in a forward direction along the temples toward the hinge between the temples and the portion of the frame 110 containing the display element 120.

In some embodiments, the adjustable transducer assembly 170 may comprise a motor. The adjustable transducer assembly 170 may initially be located in a forward position. In the forward position, the adjustable transducer assembly 170 is capable of moving in the rearward direction toward the curved end of the temples. After putting on the headset 100, the user may press a button, speak a command, or otherwise instruct the motor to drive the adjustable transducer assembly 170 rearward toward the curved end of the temples. Once the adjustable transducer assembly 170 contacts the ear of the user, the adjustable transducer assembly 170 may instruct the motor to stop driving the adjustable transducer assembly 170, and the adjustable transducer assembly 170 may remain in contact with the user's ear.

In some embodiments, the adjustable transducer assembly 170 may use a closed-loop feedback system to instruct the motor to stop driving the adjustable transducer assembly 170. In such embodiments, a force sensor (or touch sensor) may be placed within the carriage to monitor the preloading from the carriage on the helix root. As the carriage reaches the helix root, the closed-loop feedback system may constantly monitor for changes in the sensed signal from the force sensor. In response to the carriage reaching the helix root, the closed-loop feedback system detects a change in the sensed force signal, and the closed-loop feedback system may determine that the carriage is in contact with the helix root. In some embodiments, the closed-loop feedback system will ensure that the preloading from the carriage to the helix root of the user is within a target preloading value.

The adjustable transducer assembly 170 positions its transducer in a target area relative to the location of the user's ear. For example, the adjustable transducer assembly 170 may position a cartilage conduction transducer in contact with a tragus of the user's ear, or the adjustable transducer assembly 170 may position a bone conduction transducer against the user's face in a location forward of the tragus, or the adjustable transducer assembly 170 may position a speaker near or within the ear canal of the user's ear.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on or in the adjustable transducer assembly 170, placed on an interior surface of the headset 100, separate from the headset 100 (e.g., part of some other device), or some combination thereof. The number and/or locations of acoustic sensors 180 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers, or some combination thereof. The audio controller 150 provides instructions to the adjustable transducer assembly 170 to generate sounds for the user.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components are described with respect to FIG. 6.

Figure 2A:
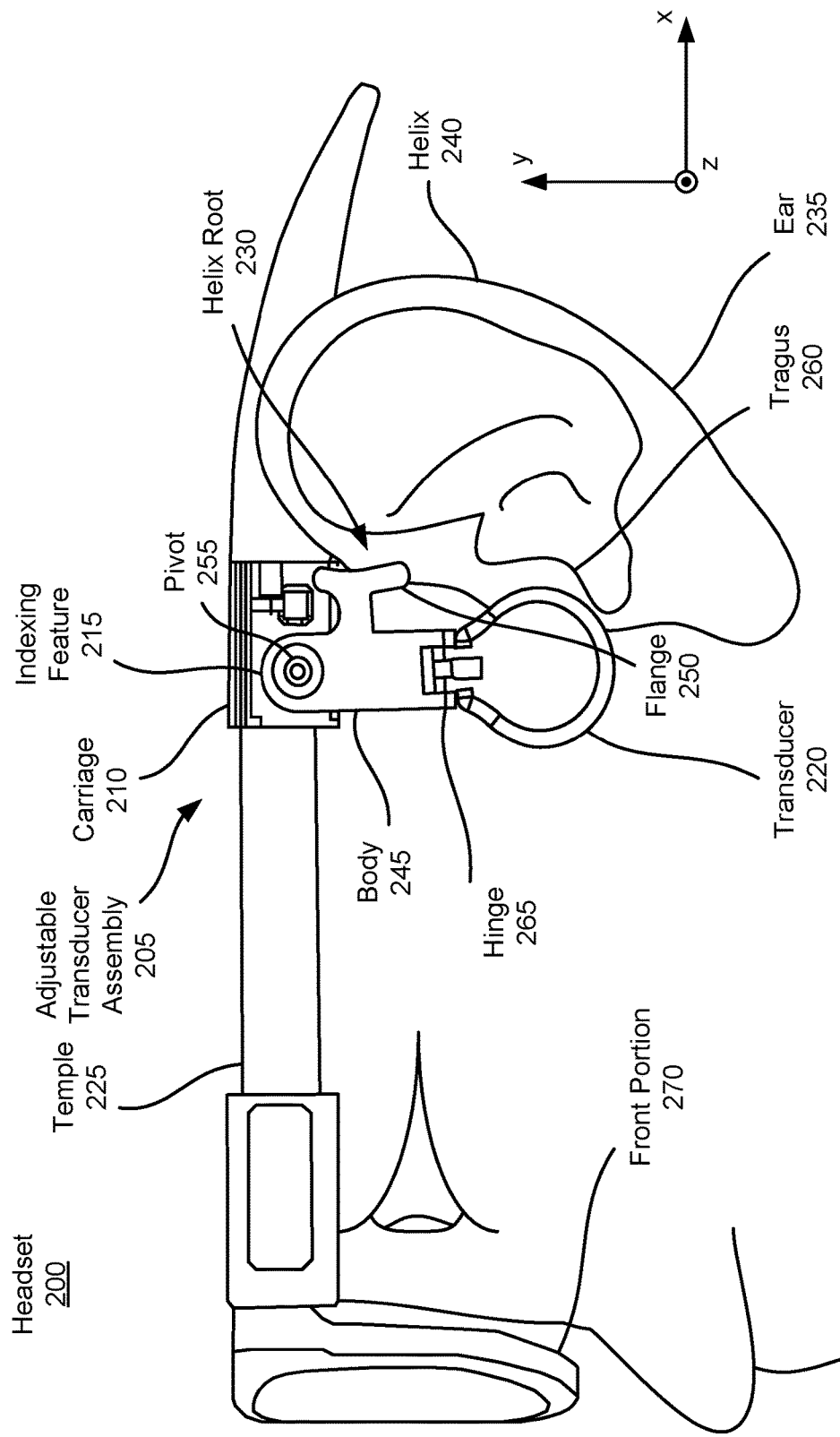
FIG. 2A is a side view of a headset with an adjustable transducer assembly in a rearward position, in accordance with one or more embodiments

FIG. 2A is a side view of a headset 200 with an adjustable transducer assembly 205 in a rearward position, in accordance with one or more embodiments. The headset 200 may be an embodiment of the headset 100 of FIG. 1. The adjustable transducer assembly 205 may be an embodiment of the adjustable transducer assembly 170 of FIG. 1. The adjustable transducer assembly 205 is biased in a rearward direction (x-direction) to the rearward position. In the rearward position, the adjustable transducer assembly 205 is capable of translating in the forward direction (negative x-direction). In some embodiments, the rearward position is the farthest position that the adjustable transducer assembly 205 can travel in the positive x-direction. The adjustable transducer assembly 205 is configured to remain in the rearward position absent an external force (e.g. a contact force, magnetic force, etc.) on the adjustable transducer assembly 205.

The adjustable transducer assembly 205 comprises a carriage 210 configured to translate along a temple 225 of the headset 200. In some embodiments, the carriage 210 may circumscribe the temple 225. In other embodiments, a portion of the carriage 210 may be located at least partially within the temple 225.

The adjustable transducer assembly comprises an indexing feature 215 configured to orient a transducer 220 relative to the ear of a user. The indexing feature 215 is configured to contact the helix root 230 of the user's ear 235. The helix root 230 is the portion of the ear 235 where the helix 240 meets the user's head. The indexing feature 215 may comprise a body 245 and a flange 250. The flange 250 may extend in a rearward direction from the body 245. The flange 250 may be the portion of the indexing feature 215 that is configured to contact the helix root 230. The body 245 and the flange 250 may be a single monolithic component. In some embodiments, the body 245 and the flange 250 may be distinct components coupled together by a fastener. The body 245 may be rotatably coupled to the carriage 210. The body 245 may be configured to rotate in the xy-plane. The body 245 may be coupled to the carriage 210 at a pivot 255.

In some embodiments, the body 245 may rotate relative to the carriage 210 at pivot 255 in response to a torque about the pivot 255 which overcomes a friction force between the pivot 255 and the body 245 and carriage 210. In other embodiments, the pivot 255 may comprise a brake mechanism which prevents the body 245 from rotating relative to the carriage 210, and a user may disengage the brake mechanism, such as by pressing a finger against the pivot 255, to rotate the indexing feature 215 if desired.

The transducer 220 may be coupled to the indexing feature 215. The transducer 220 may be a tissue transducer, such as a cartilage conduction transducer or a bone conduction transducer. The transducer 220 is configured to provide audio content via tissue conduction to a target area. For example, the transducer 220 may be configured to contact the tragus 260 of the user's ear in order to present sound to the user via cartilage conduction. The transducer 220 may be rotatably coupled to the indexing feature 215 at a hinge 265. The transducer 220 may be configured to rotate in the yz-plane. The hinge 265 may comprise a spring or other mechanism configured to bias the transducer 220 against the head of the user (e.g., in the negative z-direction).

As shown in FIG. 2A, the headset 200 is positioned on the head of the user such that the indexing feature 215 is in contact with the helix root 230 of the user's ear. However, the headset 200 is not fully in place on the user's head, as evidenced by the separation between the front portion 270 and the bridge of the user's nose 275.

Figure 2B:
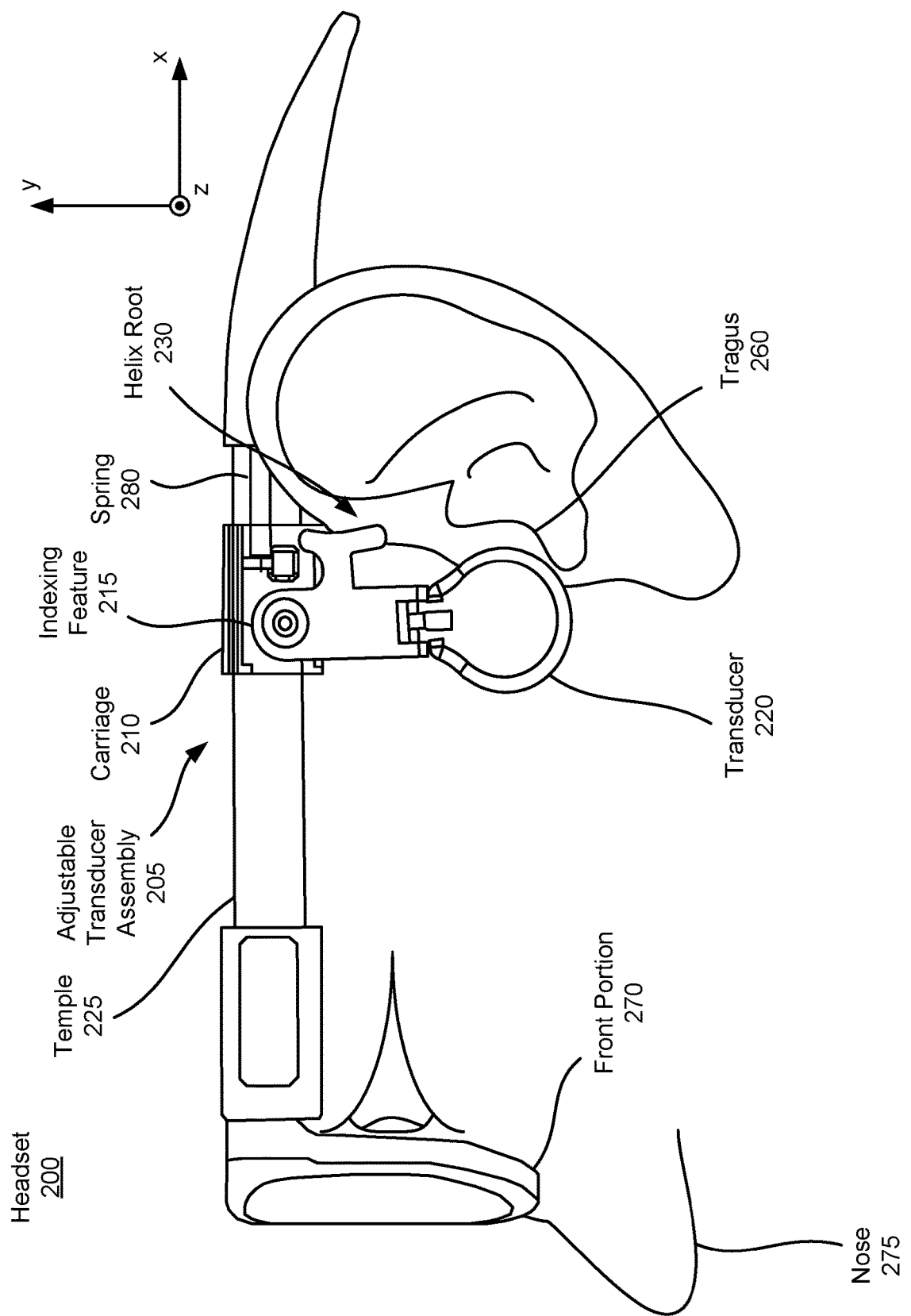
FIG. 2B is a side view of the headset of FIG. 2A in an operating position on the user's head.

FIG. 2B is a side view of the headset 200 in the operating position on the user's head. The operating position is the position in which the user would typically use the headset 200 in its intended manner, such as to view artificial reality content and/or listen to audio content presented by the headset 200. Relative to the position of the headset 200 shown in FIG. 2A, the headset 200 in FIG. 2B has been moved in the rearward (x-direction), and the front portion 270 of the headset 200 is resting on the bridge of the user's nose 275.

As the user moves the headset from the position shown in FIG. 2A in the rearward (x-direction) into the operating position shown in FIG. 2B, the helix root 230 applies a contact force on the indexing feature 215 in the positive x-direction. The adjustable transducer assembly 205 is biased in the rearward direction (x-direction) by a biasing mechanism, such as by a spring 280. The spring 280 may be a helical spring located rearward of the carriage 210 and operating as an extension spring. In other embodiments, the spring 280 may be located forward of the carriage 210 and operate as a compression spring. In response to the contact force on the indexing feature 215 in the negative x-direction exceeding the spring force on the indexing feature in the positive x-direction, the carriage 210 translates forward (negative x-direction) relative to the temple 225. The spring force may be strong enough to maintain the adjustable transducer assembly 205 in the rearward position absent an external force on the adjustable transducer assembly 205, yet weak enough to allow the headset 200 to remain in the operating position without forcing the front portion 270 of the headset 200 away from the bridge of the user's nose 275. In some embodiments, the spring constant may be between 20-40 N/m, or between 5-50 N/m.

In alternate embodiments, the adjustable transducer assembly 205 may comprise a motor. The adjustable transducer assembly 205 may initially be located in a forward position. After putting on the headset 200, the user may press a button, speak a command, or otherwise instruct the motor to drive the carriage 210 rearward. Once the indexing feature 215 contacts the ear 235 of the user, the adjustable transducer assembly 205 may instruct the motor to stop driving the carriage 210, and the indexing feature 215 may remain in contact with the user's ear. In some embodiments, the motor may detect a force as a result of the contact between the indexing feature 215 and the helix root 230, and in response to the force exceeding a threshold force, the motor may stop driving the carriage in the rearward direction. The indexing feature 215 may comprise a sensor configured to detect pressure from the ear 235 or detect proximity to the ear 235.

In the operating position, the transducer 220 is in contact with the tragus 260. Thus, the transducer 220 is in position for cartilage conduction using the tragus 260. The position of the transducer 220 (in the xy-plane) is fixed relative to the position of the indexing feature 215. The distance between the helix root 230 and the tragus 260 for different humans is much less variable than the distance between the tragus 260 and the bridge of the nose 275. By positioning the transducer 220 relative to the location of the helix root 230 using the adjustable transducer assembly 205, the transducer 220 is more consistently located adjacent to the tragus 260 as compared to headsets which do not include an adjustable transducer assembly.

Figure 2C:
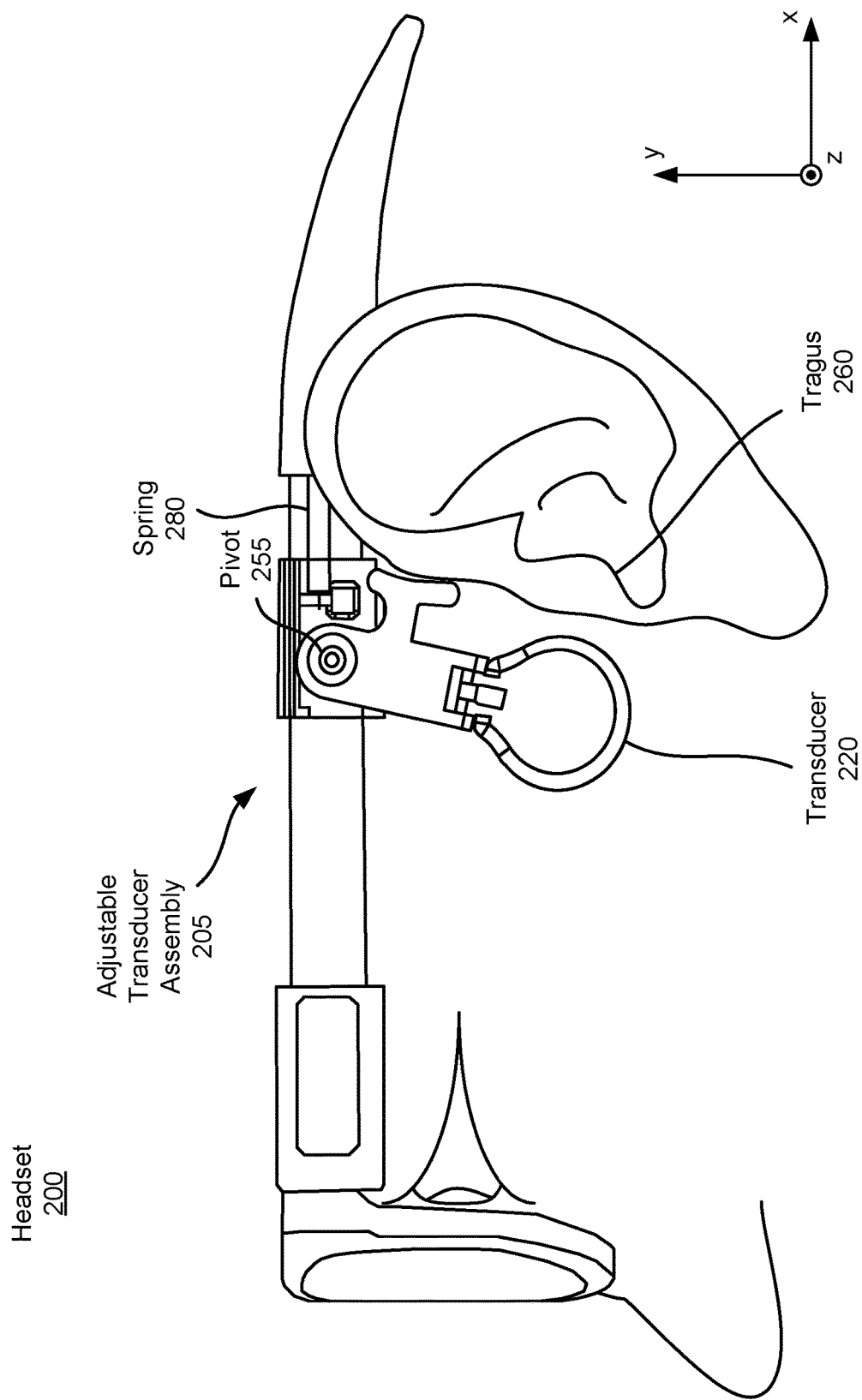
FIG. 2C illustrates a side view of the headset of FIG. 2A in the operating position with the transducer configured for bone conduction at a condyle location.

FIG. 2C illustrates a side view of the headset 200 in the operating position with the transducer 220 configured for bone conduction in a condoyle position. In some embodiments, the transducer 220 may be a bone conduction transducer, or the transducer 220 may comprise both a bone conduction transducer and a cartilage conduction transducer. Relative to the position of the adjustable transducer assembly 205 shown in FIG. 2B, the adjustable transducer assembly 205 has been rotated in a clockwise direction about the pivot 255. As shown in FIG. 2C, the transducer 220 is in contact (via the skin of the user) with a condoyle of a bone in the user's head. In some embodiments, the user may physically rotate the adjustable transducer assembly 205 using the user's hand. In other embodiments, the headset 200 may comprise a motor which rotates the adjustable transducer assembly 205 about the pivot 255, and the headset 200 may rotate the adjustable transducer assembly 205 in response to a command from the user, or in response to the headset determining that the audio system of the headset 200 is in a bone conduction mode. The transducer 220 is located forward (negative x-direction) of the tragus 260, such as between 0.5-1.0 cm forward of the tragus. The transducer 220 is configured to produce sound for the user via bone conduction by transmitting energy through a bone of the user's head, such as a portion of the skull.

Figure 3A:
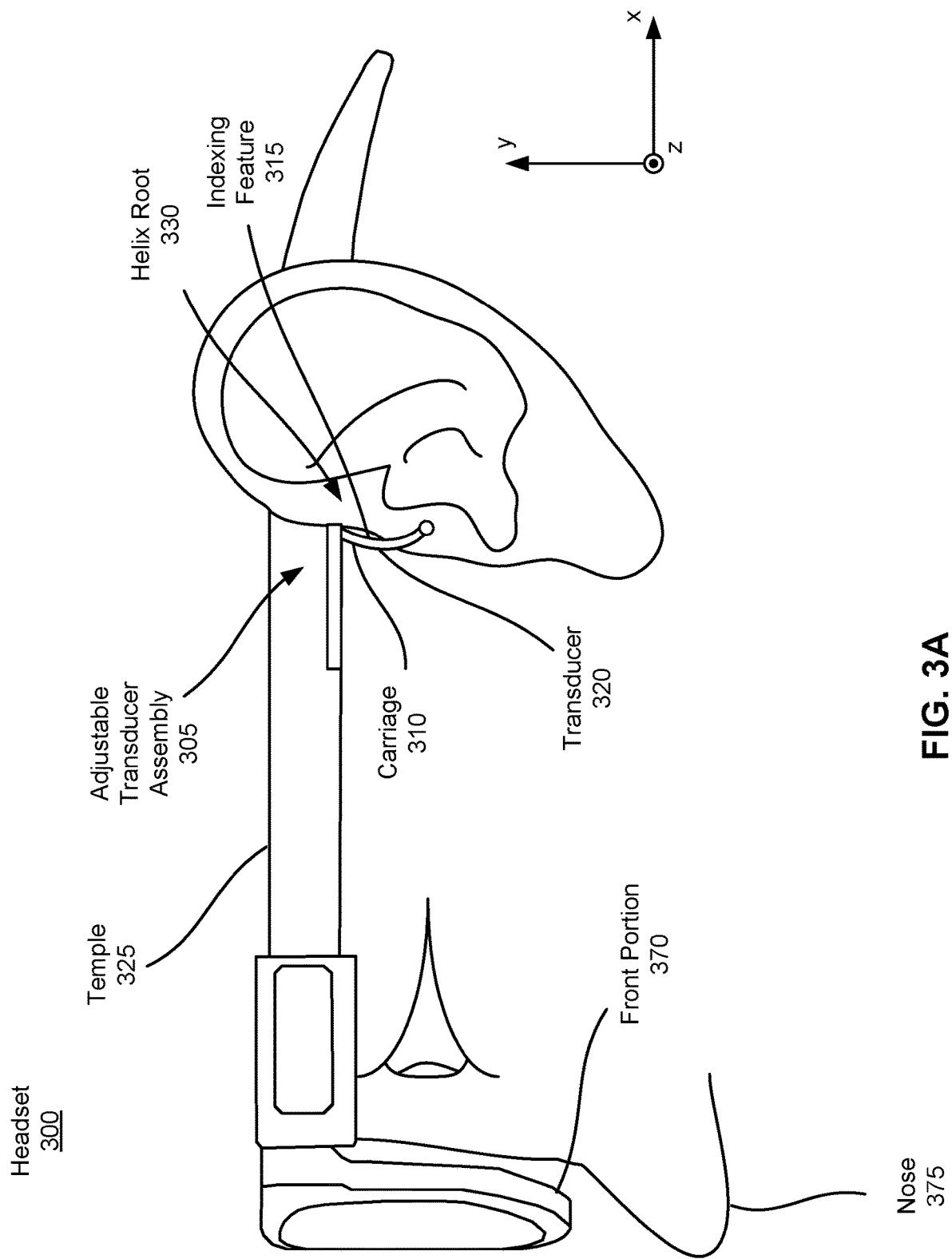
FIG. 3A illustrates a side view of a headset with an adjustable transducer assembly having a transducer located within a carriage and in a rearward position, in accordance with one or more embodiments.

FIG. 3A illustrates a side view of a headset 300 with an adjustable transducer assembly 305 in a rearward position, in accordance with one or more embodiments. The headset 300 may be an embodiment of the headset 100 of FIG. 1. The adjustable transducer assembly 305 may be an embodiment of the adjustable transducer assembly 170 of FIG. 1. The adjustable transducer assembly 305 operates in substantially the same way as the adjustable transducer assembly 205 of FIG. 2A-2C. However, the size and shape of the adjustable transducer assembly 305 is different than the adjustable transducer assembly 205.

The carriage 310 comprises a curved shape, generally forming a segment of a circle. A portion of the carriage 310 may be located at least partially within the temple 325. The indexing feature 315 may be a surface of the carriage 310, such as the rear surface of the carriage 310. The transducer 320 may be located within or coupled to the carriage 310. As shown in FIG. 3A, the headset 300 is positioned on the head of the user such that the indexing feature 315 is in contact with the helix root 330 of the user's ear. However, the headset 300 is not fully in place on the user's head, as evidenced by the separation between the front portion 370 and the bridge of the user's nose 375.

Figure 3B:
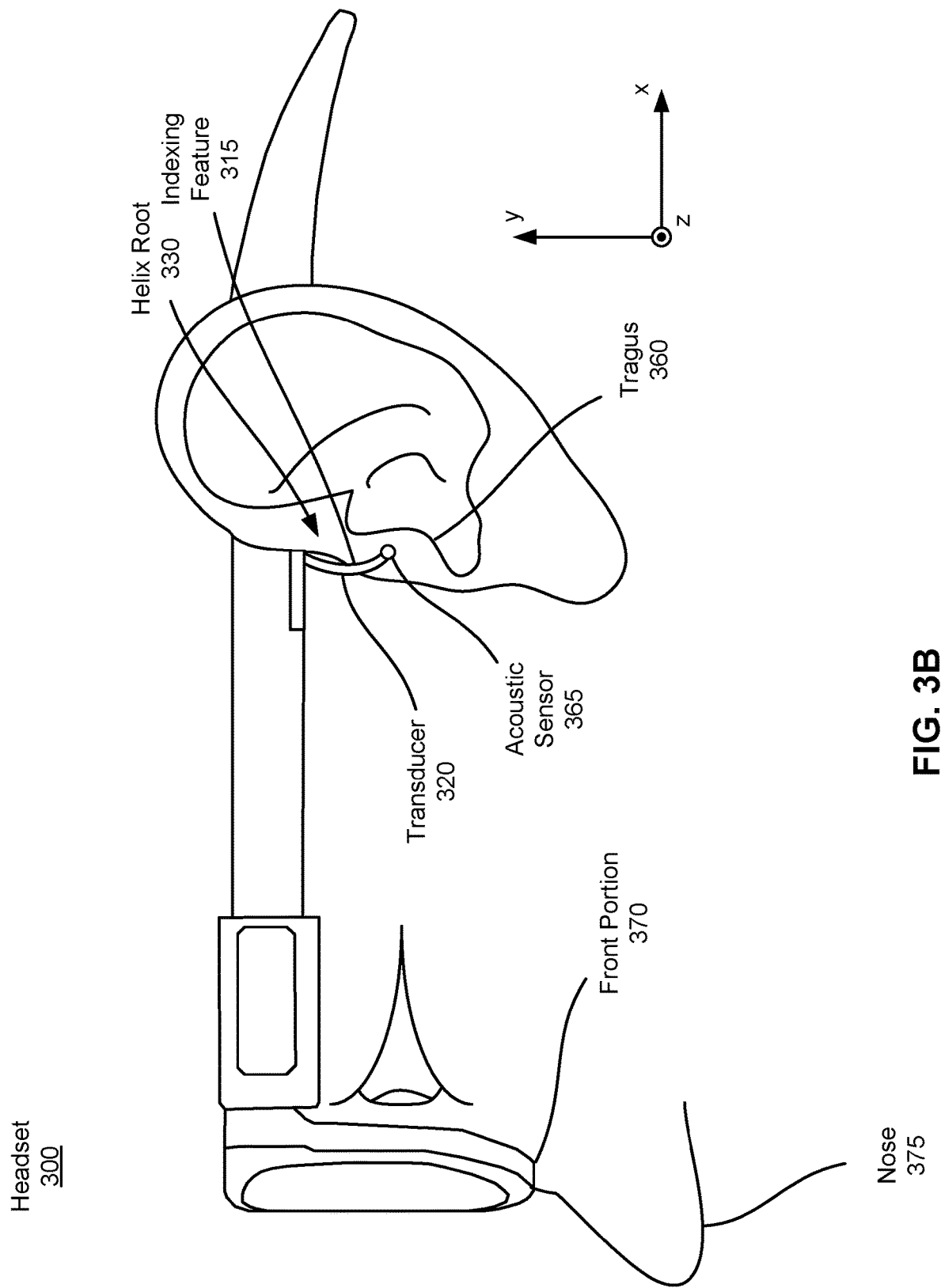
FIG. 3B is a side view of the headset of FIG. 3A in an operating position on the user's head.

FIG. 3B is a side view of the headset 300 in the operating position on the user's head. Relative to the position of the headset 300 shown in FIG. 3A, the headset 300 in FIG. 3B has been moved in the rearward (x-direction), and the front portion 370 of the headset 300 is resting on the bridge of the user's nose 375.

As the user moves the headset from the position shown in FIG. 3A in the rearward direction (x-direction) into the operating position shown in FIG. 3B, the helix root 330 applies a contact force on the indexing feature 315 in the positive x-direction. In the operating position, the transducer 320 is in contact with the tragus 360. Thus, the transducer 320 is in the position for cartilage conduction using the tragus 360. The position of the transducer 320 (in the xy-plane) is fixed relative to the position of the indexing feature 315.

In some embodiments, the transducer 320 may comprise a malleable tube/pipe that carries acoustic waves from the transducer assembly 305 to the opening of the ear canal. The transducer 320 may comprise an air conduction transducer, or microspeaker (or array of speakers) embedded inside the adjustable transducer assembly 305 that create air-conducted sound. The malleable tube/pipe may be adjusted, such that air conducted sound can be delivered to the opening of the ear-canal with minimal adjustment.

In some embodiments, the adjustable transducer assembly 305 may comprise a an acoustic sensor 365, such as a microphone. The acoustic sensor 365 may be used to collect real-time signals at any time. A control system may create corresponding filters based on the detected sound using the acoustic sensor 365 and make sure that the user will always receive a target curve. Typically, a flat curve at the opening of the ear-canal can be considered as a target curve.

Figure 3C:
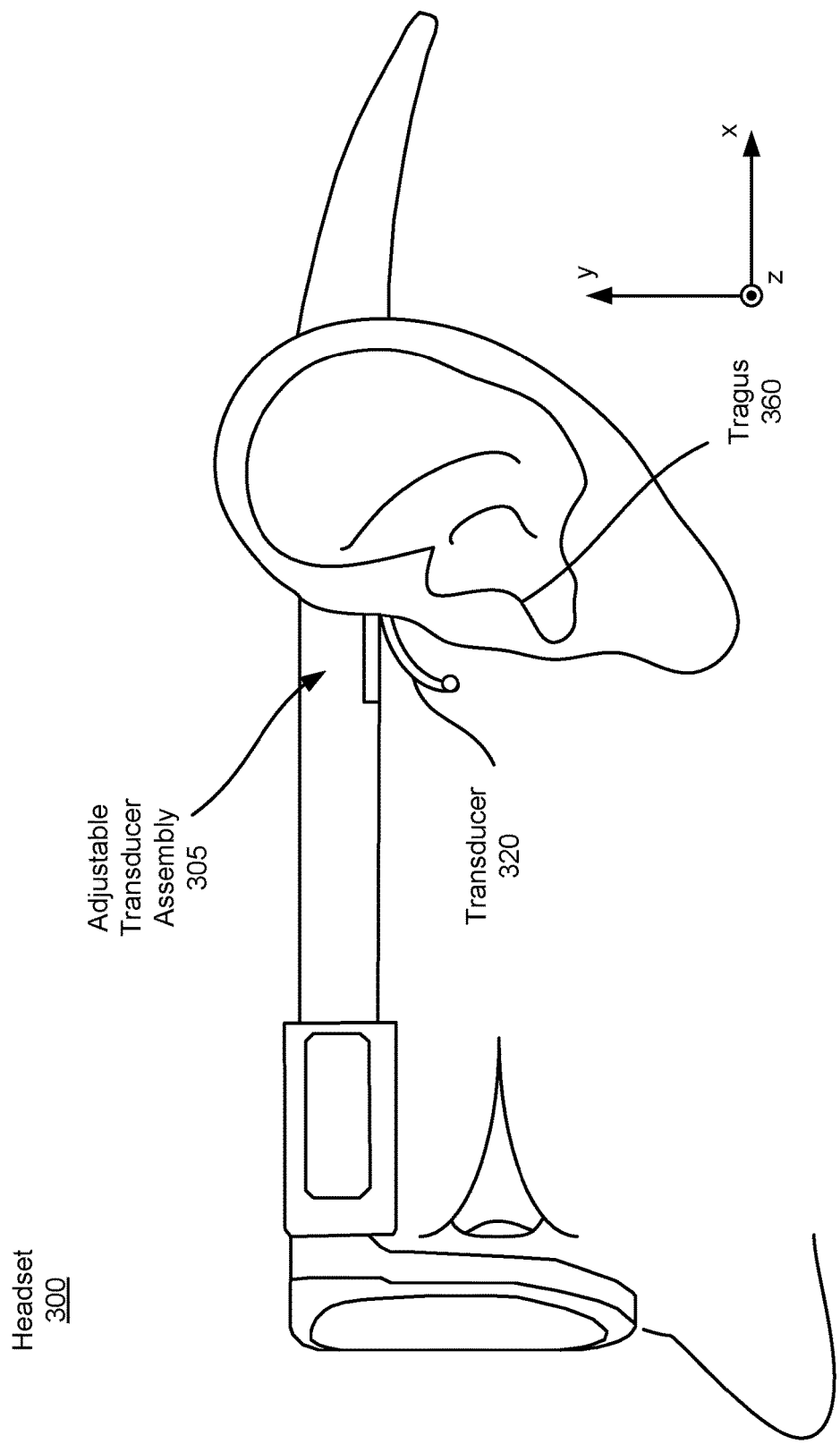
FIG. 3C illustrates a side view of the headset of FIG. 3A in the operating position with the transducer configured for bone conduction.

FIG. 3C illustrates a side view of the headset 300 in the operating position with the transducer 320 configured for bone conduction. Relative to the position of the adjustable transducer assembly 305 shown in FIG. 3B, the adjustable transducer assembly 305 has been rotated in a clockwise direction. The transducer 320 is located forward (negative x-direction) of the tragus 360, such as between 0.5-1.0 cm forward of the tragus. The transducer 320 is configured to produce sound for the user via bone conduction by transmitting energy through a bone of the user's head, such as a portion of the skull.

Figure 4:
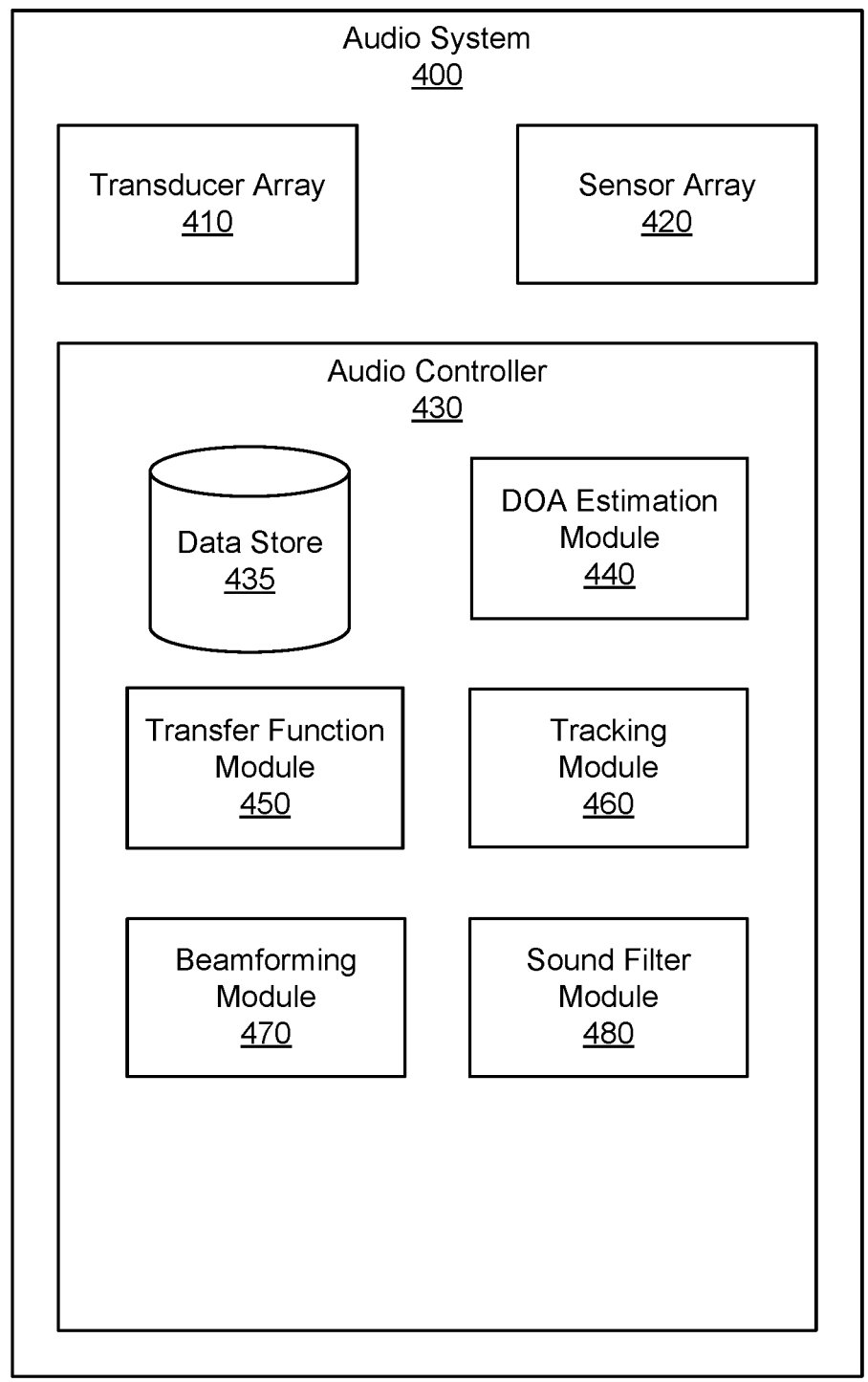
FIG. 4 is a block diagram of an audio system, in accordance with one or more embodiments.

FIG. 4 is a block diagram of an audio system 400, in accordance with one or more embodiments. The audio system in FIG. 1 may be an embodiment of the audio system 400. The audio system 400 generates one or more acoustic transfer functions for a user. The audio system 400 may then use the one or more acoustic transfer functions to generate audio content for the user. In the embodiment of FIG. 4, the audio system 400 includes a transducer array 410, a sensor array 420, and an audio controller 430. Some embodiments of the audio system 400 have different components than those described here. Similarly, in some cases, functions can be distributed among the components in a different manner than is described here.

The transducer array 410 is configured to present audio content. The transducer array 410 includes a plurality of transducers. A transducer is a device that provides audio content. A transducer may be, e.g., a speaker, a tissue transducer (e.g., the tissue transducer 160), some other device that provides audio content, or some combination thereof. A tissue transducer may be configured to function as a bone conduction transducer or a cartilage conduction transducer. The transducer array 410 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 410 may include one or more transducers to cover different parts of a frequency range. For example, a moving coil transducer may be used to cover a first part of a frequency range and a piezoelectric transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 430, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 410 generates audio content in accordance with instructions from the audio controller 430. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 400. The transducer array 410 may be coupled to a wearable device (e.g., the headset 100). In alternate embodiments, the transducer array 410 may be a plurality of speakers that are separate from the wearable device (e.g., coupled to an external console).

The transducer array 410 includes an adjustable transducer assembly, such as the adjustable transducer assembly 170 of FIG. 1. The adjustable transducer assembly is configured to translate forwards and backwards along the temples of the frame. The adjustable transducer assembly includes a transducer, such as a speaker, a cartilage transducer, or a bone transducer. The adjustable transducer assembly may be biased in a rearward position, such as by a spring. In response to a user putting on the headset, the adjustable transducer assembly is configured to contact a portion of the ear of the user. The contact between the ear and the adjustable transducer assembly may cause the adjustable transducer assembly to translate in the forward direction along the temples.

In some embodiments, the adjustable transducer assembly may comprise a motor. The adjustable transducer assembly 170 may initially be located in a forward position. After putting on the headset, the user may press a button, speak a command, or otherwise instruct the motor to drive the adjustable transducer assembly rearward. Once the adjustable transducer assembly contacts the ear of the user, the adjustable transducer assembly may instruct the motor to stop driving the adjustable transducer assembly, and the adjustable transducer assembly may remain in contact with the user's ear.

The adjustable transducer assembly positions its transducer in a target area relative to the location of the user's ear. For example, the adjustable transducer assembly may position a cartilage conduction transducer in contact with a tragus of the user's ear, or the adjustable transducer assembly may position a bone conduction transducer against the user's face in a location forward of the tragus, or the adjustable transducer assembly may position a speaker near or within the ear canal of the user's ear.

The sensor array 420 detects sounds within a local area surrounding the sensor array 420. The sensor array 420 may include a plurality of acoustic sensors that each detect air pressure variations of a sound wave and convert the detected sounds into an electronic format (analog or digital). The plurality of acoustic sensors may be positioned on a headset (e.g., headset 100), on a user (e.g., in an ear canal of the user), on a neckband, or some combination thereof. An acoustic sensor may be, e.g., a microphone, a vibration sensor, an accelerometer, or any combination thereof. In some embodiments, the sensor array 420 is configured to monitor the audio content generated by the transducer array 410 using at least some of the plurality of acoustic sensors. Increasing the number of sensors may improve the accuracy of information (e.g., directionality) describing a sound field produced by the transducer array 410 and/or sound from the local area.

The audio controller 430 controls operation of the audio system 400. In the embodiment of FIG. 4, the audio controller 430 includes a data store 435, a DOA estimation module 440, a transfer function module 450, a tracking module 460, a beamforming module 470, and a sound filter module 480. The audio controller 430 may be located inside a headset, in some embodiments. Some embodiments of the audio controller 430 have different components than those described here. Similarly, functions can be distributed among the components in different manners than described here. For example, some functions of the controller may be performed external to the headset.

The data store 435 stores data for use by the audio system 400. Data in the data store 435 may include sounds recorded in the local area of the audio system 400, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 400, or any combination thereof.

The DOA estimation module 440 is configured to localize sound sources in the local area based in part on information from the sensor array 420. Localization is a process of determining where sound sources are located relative to the user of the audio system 400. The DOA estimation module 440 performs a DOA analysis to localize one or more sound sources within the local area. The DOA analysis may include analyzing the intensity, spectra, and/or arrival time of each sound at the sensor array 420 to determine the direction from which the sounds originated. In some cases, the DOA analysis may include any suitable algorithm for analyzing a surrounding acoustic environment in which the audio system 400 is located.

For example, the DOA analysis may be designed to receive input signals from the sensor array 420 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 420 received the direct-path audio signal. The determined angle may then be used to identify the DOA for the received input signal. Other algorithms not listed above may also be used alone or in combination with the above algorithms to determine DOA.

In some embodiments, the DOA estimation module 440 may also determine the DOA with respect to an absolute position of the audio system 400 within the local area. The position of the sensor array 420 may be received from an external system (e.g., some other component of a headset, an artificial reality console, a mapping server, a position sensor (e.g., the position sensor 190), etc.). The external system may create a virtual model of the local area, in which the local area and the position of the audio system 400 are mapped. The received position information may include a location and/or an orientation of some or all of the audio system 400 (e.g., of the sensor array 420). The DOA estimation module 440 may update the estimated DOA based on the received position information.

The transfer function module 450 is configured to generate one or more acoustic transfer functions. Generally, a transfer function is a mathematical function giving a corresponding output value for each possible input value. Based on parameters of the detected sounds, the transfer function module 450 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 420. Accordingly, for a sound source there is a corresponding transfer function for each of the acoustic sensors in the sensor array 420. And collectively the set of transfer functions is referred to as an ATF. Accordingly, for each sound source there is a corresponding ATF. Note that the sound source may be, e.g., someone or something generating sound in the local area, the user, or one or more transducers of the transducer array 410. The ATF for a particular sound source location relative to the sensor array 420 may differ from user to user due to a person's anatomy (e.g., ear shape, shoulders, etc.) that affects the sound as it travels to the person's ears. Accordingly, the ATFs of the sensor array 420 are personalized for each user of the audio system 400.

In some embodiments, the transfer function module 450 determines one or more HRTFs for a user of the audio system 400. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 450 may determine HRTFs for the user using a calibration process. In some embodiments, the transfer function module 450 may provide information about the user to a remote system. The remote system determines a set of HRTFs that are customized to the user using, e.g., machine learning, and provides the customized set of HRTFs to the audio system 400.

The tracking module 460 is configured to track locations of one or more sound sources. The tracking module 460 may compare current DOA estimates and compare them with a stored history of previous DOA estimates. In some embodiments, the audio system 400 may recalculate DOA estimates on a periodic schedule, such as once per second, or once per millisecond. The tracking module may compare the current DOA estimates with previous DOA estimates, and in response to a change in a DOA estimate for a sound source, the tracking module 460 may determine that the sound source moved. In some embodiments, the tracking module 460 may detect a change in location based on visual information received from the headset or some other external source. The tracking module 460 may track the movement of one or more sound sources over time. The tracking module 460 may store values for a number of sound sources and a location of each sound source at each point in time. In response to a change in a value of the number or locations of the sound sources, the tracking module 460 may determine that a sound source moved. The tracking module 460 may calculate an estimate of the localization variance. The localization variance may be used as a confidence level for each determination of a change in movement.

The beamforming module 470 is configured to process one or more ATFs to selectively emphasize sounds from sound sources within a certain area while de-emphasizing sounds from other areas. In analyzing sounds detected by the sensor array 420, the beamforming module 470 may combine information from different acoustic sensors to emphasize sound associated from a particular region of the local area while deemphasizing sound that is from outside of the region. The beamforming module 470 may isolate an audio signal associated with sound from a particular sound source from other sound sources in the local area based on, e.g., different DOA estimates from the DOA estimation module 440 and the tracking module 460. The beamforming module 470 may thus selectively analyze discrete sound sources in the local area. In some embodiments, the beamforming module 470 may enhance a signal from a sound source. For example, the beamforming module 470 may apply sound filters which eliminate signals above, below, or between certain frequencies. Signal enhancement acts to enhance sounds associated with a given identified sound source relative to other sounds detected by the sensor array 420.

The sound filter module 480 determines sound filters for the transducer array 410. In some embodiments, the sound filters cause the audio content to be spatialized, such that the audio content appears to originate from a target region. The sound filter module 480 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 480 calculates one or more of the acoustic parameters. In some embodiments, the sound filter module 480 requests the acoustic parameters from a mapping server (e.g., as described below with regard to FIG. 6).

The sound filter module 480 provides the sound filters to the transducer array 410. In some embodiments, the sound filters may cause positive or negative amplification of sounds as a function of frequency.

FIG. 5 is a flowchart of a method 500 for providing audio content using an adjustable transducer assembly, in accordance with one or more embodiments. The process shown in FIG. 5 may be performed using components of headset, such as an audio system (e.g., audio system 400). Other entities may perform some or all of the steps in FIG. 5 in other embodiments. Embodiments may include different and/or additional steps, or perform the steps in different orders. The headset may be an AR or VR headset configured to provide audio content to the user. The headset includes an adjustable transducer assembly. The adjustable transducer assembly comprises a carriage, and indexing feature, and a tissue transducer. The adjustable transducer assembly is configured to translate along a temple of the headset.

The headset translates 510 the adjustable transducer assembly along the temple of the headset. The headset may translate the adjustable transducer assembly in response to the user placing the headset on the user's head. In some embodiments, the adjustable transducer assembly may translate using a motor which drives the adjustable transducer assembly along the headset. In other embodiments, the user may apply a contact force to the adjustable transducer assembly using a body part of the user, such as the helix root of the user's ear, which causes the adjustable transducer assembly to translate along the temple.

The headset contacts 520 a helix root of the user's ear with an indexing feature on the adjustable transducer assembly. In some embodiments, the indexing feature may contact the helix root prior to translating the adjustable transducer assembly, and the helix root of the user's ear may remain in contact with the indexing feature after translating the adjustable transducer assembly. In other embodiments, the headset may translate the adjustable transducer assembly along the temple of the headset until the indexing feature contacts the helix root.

The headset produces 530 audio content for the user via tissue conduction using the tissue transducer on the adjustable transducer assembly. The headset may present the audio content to the user using cartilage and/or bone conduction. For example, the tissue transducer may be a cartilage conduction transducer, and the cartilage conduction transducer may provide audio content to the user by vibrating the tragus of the user's ear.

In embodiments utilizing binaural microphones at the entrance to the ear-canal, an audio system may ensure that the target sound pressure output (sound pressure at the opening of the ear canal) is consistent with a target curve. In some embodiments, a flat target curve may be desired. However, the raw output of the tissue transducer is not always flat; thus, the output may be equalized by the audio system.

Figure 6:
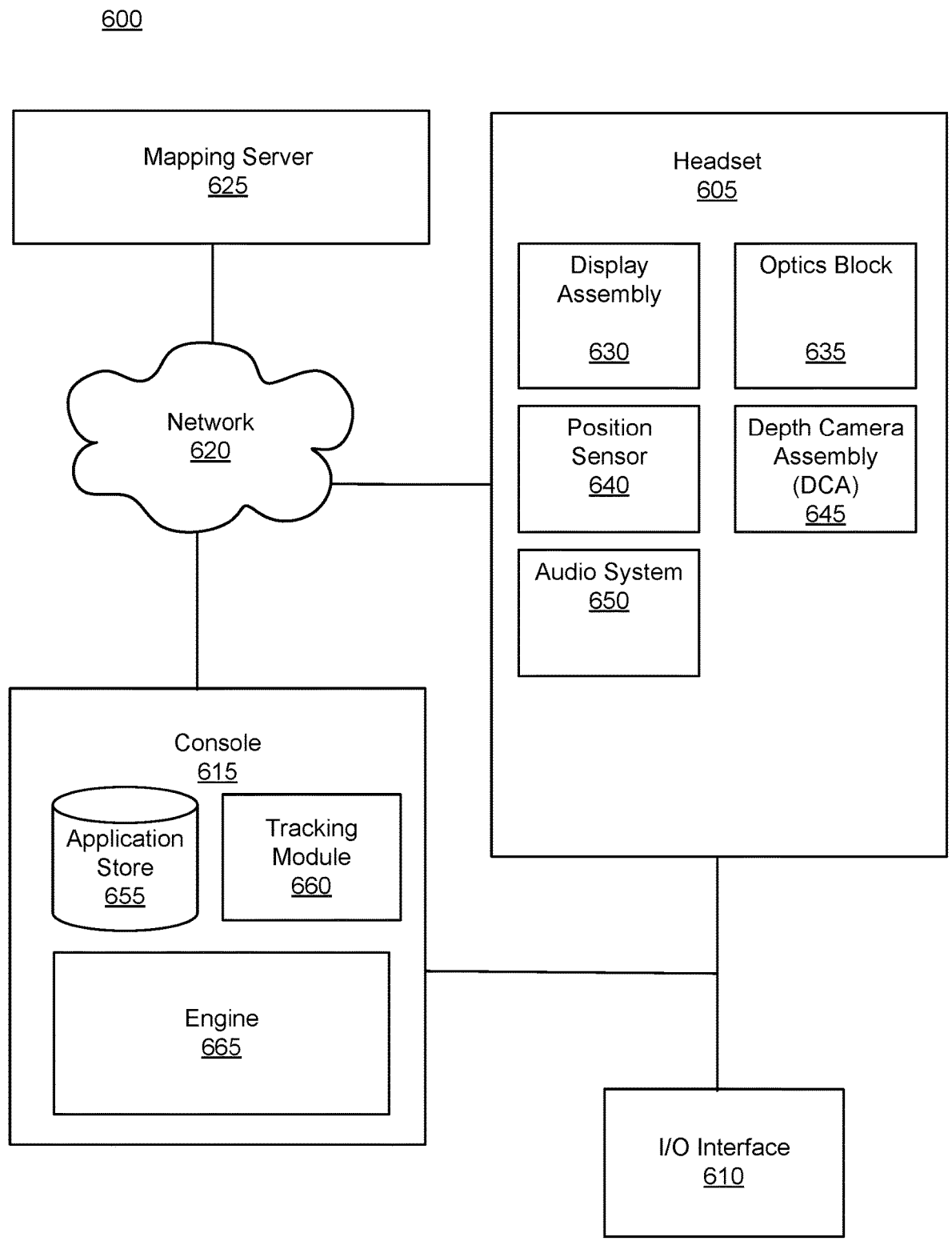
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1.

The audio system 650 provides audio content to a user of the headset 605. The audio system 650 is similar to the audio system 400 describe above. The audio system 650 may comprise one or acoustic sensors, one or more transducers, and an audio controller. The audio system 650 includes an adjustable transducer assembly, such as the adjustable transducer assembly 170 of FIG. 1. The adjustable transducer assembly is configured to translate forwards and backwards along the temples of the frame. The adjustable transducer assembly includes a transducer, such as a speaker, a cartilage transducer, or a bone transducer. The adjustable transducer assembly may be biased in a rearward position, such as by a spring. In response to a user putting on the headset 605, the adjustable transducer assembly is configured to contact a portion of the ear of the user. The contact between the ear and the adjustable transducer assembly may cause the adjustable transducer assembly to translate in the forward direction along the temples.

The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the mapping server 625, and use the sound filters to provide audio content to the user via tissue conduction using the adjustable transducer assembly.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An adjustable transducer assembly comprising:
a tissue transducer configured to provide audio content to a user of a headset;
a motor;
a carriage, driven by the motor, configured to translate along a temple of the headset, the carriage coupled to the tissue transducer and including an indexing feature, wherein the indexing feature is configured to translate with the carriage along the temple in a direction toward a rear portion of the headset until the indexing feature contacts a helix root of an ear of the user; and
a closed-loop feedback system, in response to the indexing feature contacting the helix root of the ear, configured to cause the motor to stop driving the carriage such that the indexing feature is positioned against the helix root and the tissue transducer is positioned to provide the audio content via tissue conduction to a target area.

2. The adjustable transducer assembly of claim 1, wherein the motor is further configured to position the tissue transducer based on an input from the user.

3. The adjustable transducer assembly of claim 1, wherein the tissue transducer comprises a cartilage conduction transducer, and wherein the target area is a tragus of the ear of the user.

4. The adjustable transducer assembly of claim 1, wherein the indexing feature is rotatably coupled to the carriage.

5. The adjustable transducer assembly of claim 1, wherein the tissue transducer is located at least partially within the carriage.

6. The adjustable transducer assembly of claim 1, wherein the tissue transducer is coupled to the indexing feature via a hinge.

7. The adjustable transducer assembly of claim 1, wherein in response to an input, the tissue transducer is configured to move from a cartilage conduction position to a bone conduction position, or from the bone conduction position to the cartilage conduction position.

8. A headset comprising:
a frame including a temple;
an adjustable transducer assembly coupled to the temple, the adjustable transducer assembly comprising:
a tissue transducer configured to provide audio content to a user of a headset, a motor,
a carriage, driven by the motor, configured to translate along a temple of the headset, the carriage coupled to the tissue transducer and including an indexing feature, wherein the indexing feature is configured to translate with the carriage along the temple in a direction toward a rear portion of the headset until the indexing feature contacts a helix root of an ear of the user, and
a closed-loop feedback system, in response to the indexing feature contacting the helix root of the ear, configured to cause the motor to stop driving the carriage such that the indexing feature is positioned against the helix root and the tissue transducer is positioned to provide the audio content via tissue conduction to a target area.

9. The headset of claim 8, wherein the tissue transducer comprises a cartilage conduction transducer, and wherein the target area is a tragus of the ear of the user.

10. The headset of claim 8, wherein the motor is further configured to drive the carriage along the temple.

11. The headset of claim 8, wherein the indexing feature is rotatably coupled to the carriage.

12. The headset of claim 8, wherein the tissue transducer is located at least partially within the carriage.

13. The headset of claim 8, wherein the tissue transducer is coupled to the indexing feature via a hinge.

14. The headset of claim 8, wherein in response to an input from the user, the tissue transducer is configured to move from a cartilage conduction position to a bone conduction position.

15. A headset comprising:
a frame including a temple;
a motor;
a carriage, driven by the motor, configured to translate along the temple in a direction toward a rear portion of the headset until the carriage contacts a helix root of an ear of a user;
a closed-loop feedback system, in response to the carriage contacting the helix root of the ear, configured to cause the motor to stop driving the carriage; and
a cartilage conduction transducer coupled to the carriage, wherein the cartilage conduction transducer is configured to contact a tragus of the user.

16. The headset of claim 15, further comprising an indexing feature configured to contact the helix root.

17. The headset of claim 16, wherein a distance between the indexing feature and the cartilage conduction transducer is fixed.

18. The headset of claim 16, wherein the cartilage conduction transducer is coupled to the indexing feature via a hinge.

* * * * *